(12) United States Patent
Nathan et al.

(10) Patent No.: US 7,421,881 B2
(45) Date of Patent: Sep. 9, 2008

(54) METHOD AND SYSTEM FOR DEGASSING A FLUID

(75) Inventors: Eugene Nathan, Lillestrøm (NO); Arnfinn Joli, Sandnes (NO)

(73) Assignee: Baker Hughes Incorporated, Houston, TX (US)

( * ) Notice: Subject to any disclaimer, the term of this patent is extended or adjusted under 35 U.S.C. 154(b) by 236 days.

(21) Appl. No.: 10/972,842

(22) Filed: Oct. 25, 2004

(65) Prior Publication Data

US 2005/0150381 A1    Jul. 14, 2005

Related U.S. Application Data

(60) Provisional application No. 60/514,869, filed on Oct. 27, 2003.

(51) Int. Cl.
*G01N 33/24* (2006.01)

(52) U.S. Cl. ........................ 73/19.09; 73/19.1

(58) Field of Classification Search ............... 73/19.09
See application file for complete search history.

(56) References Cited

U.S. PATENT DOCUMENTS

| | | | | |
|---|---|---|---|---|
| 3,139,126 | A | 6/1964 | Fromm et al. .................. 146/3 |
| 3,381,536 | A | 5/1968 | Horeth et. al. ............. 73/421.5 |
| 3,746,262 | A * | 7/1973 | Bete et al. ..................... 239/458 |
| 4,328,107 | A * | 5/1982 | Wright ......................... 210/703 |
| 4,411,673 | A | 10/1983 | Jones et al. ..................... 55/41 |
| 4,416,672 | A | 11/1983 | Underwood ................. 55/190 |
| 4,635,735 | A | 1/1987 | Crownover ................... 175/48 |
| 4,887,464 | A | 12/1989 | Tannenbaum et al. ......... 73/153 |
| 5,007,488 | A | 4/1991 | Donovan ...................... 175/59 |
| 5,090,256 | A | 2/1992 | Issenmann ............... 73/863.23 |
| 5,199,509 | A | 4/1993 | Wright et al. ................. 175/50 |
| 5,269,832 | A | 12/1993 | Meijer ........................... 95/25 |
| 5,688,402 | A | 11/1997 | Green et al. ................ 210/355 |
| 5,775,442 | A | 7/1998 | Speed .......................... 175/48 |
| 6,354,345 | B1 | 3/2002 | Nabity et al. ............... 141/284 |
| 6,389,878 | B1 | 5/2002 | Zamfes ..................... 73/19.09 |
| 6,547,855 | B1 | 4/2003 | Schmidtke ................... 95/149 |
| 2002/0017193 | A1 | 2/2002 | Ramos ......................... 95/260 |
| 2003/0227820 | A1 * | 12/2003 | Parrent ..................... 366/162.4 |
| 2004/0265176 | A1 | 12/2004 | Kerherve et al. ........... 422/68.1 |

FOREIGN PATENT DOCUMENTS

| | | |
|---|---|---|
| EP | 1 206 956 A2 | 5/2002 |
| GB | 1 253 540 | 12/1968 |

OTHER PUBLICATIONS

PCT International Search Report.

* cited by examiner

*Primary Examiner*—Hezron E. Williams
*Assistant Examiner*—Paul M West
(74) *Attorney, Agent, or Firm*—Cantor Colburn LLP

(57) ABSTRACT

Disclosed herein is a system for degassing a fluid including a sample probe in operable communication with a pump which is in operable communication with a gas trap wherein one or more nozzles are located to accelerate and expel the fluid into the gas trap thereby liberating dissolved gases in the fluid. A method for degassing a fluid is also disclosed. The method includes directing a pressurized fluid toward one or more nozzles and accelerating and expelling fluid through the nozzles.

18 Claims, 5 Drawing Sheets

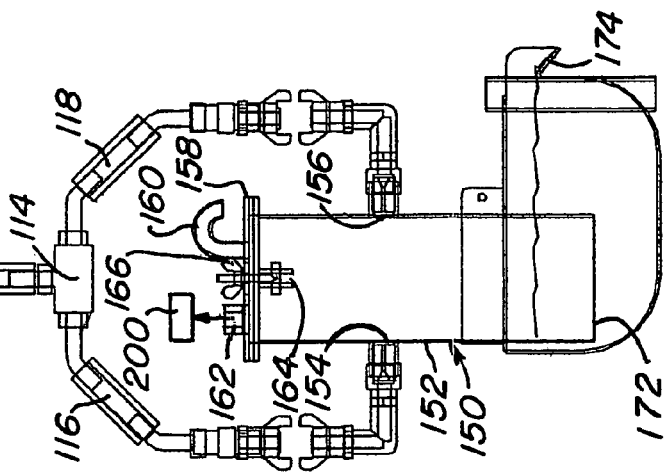
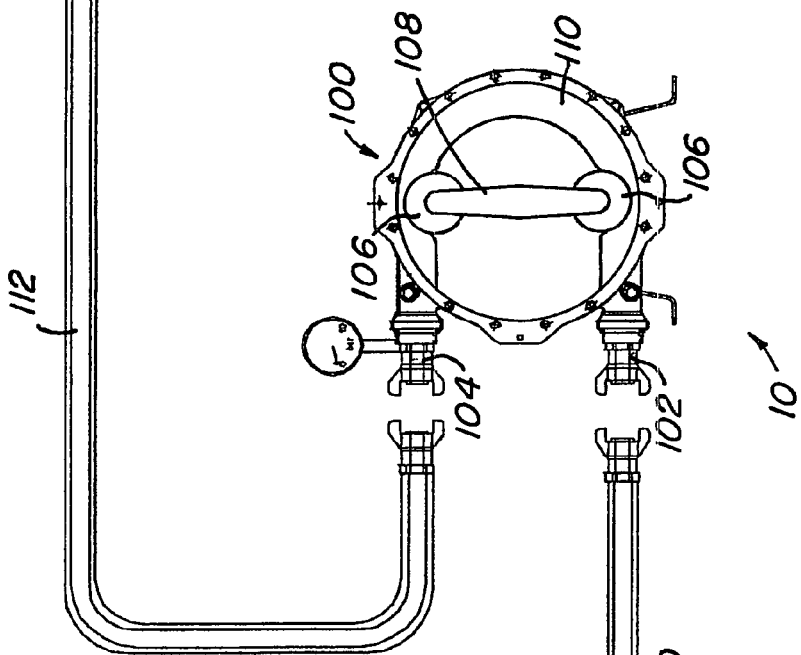
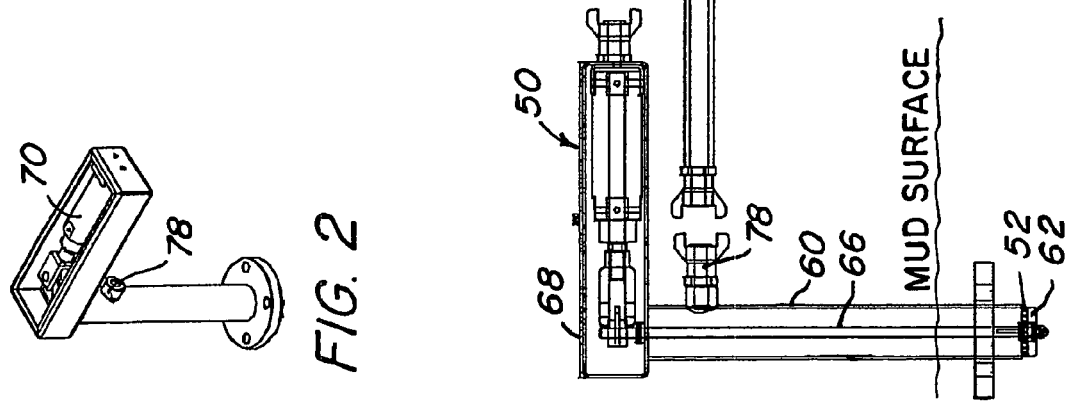
FIG. 1
FIG. 2

METHOD AND SYSTEM FOR DEGASSING A FLUID

CROSS-REFERENCE TO RELATED APPLICATIONS

This application claims the benefit of an earlier filing date from U.S. Ser. No. 60/514,869 filed Oct. 27, 2003, the entire contents of which is incorporated herein by reference.

BACKGROUND

In the hydrocarbon industry, wellbores are drilled based upon available geological data. Many times the expectation of accessing a hydrocarbon bearing formation are realized. Unfortunately, however this is not always the case. For this reason, among others, methods and apparatus are employed to gain information as the process continues.

One of those methods and apparatus relates to determining a quantity of a gas dissolved in the drilling mud. This provides valuable information about the probability that a particular formation being accessed will bear profitable hydrocarbon levels because formation solids, where that formation is a hydrocarbon bearing one, tend to have gas dissolved therein of a type(s) associated with the existence of profitable hydrocarbons nearby. The more gas present, the more likely the formation will prove profitable.

Drilling mud has been tested for the presence of dissolved gases in the prior art but the devices used for the extraction and liberation of gas from the drilling fluid are complex, require a large amount of space and therefore must be placed some distance from the wellhead. Distance is deleterious to the process as gases come out of solution and dissipate en route to the device. This often leaves too little gas to be measurable or if still measurable causes uncertainty regarding actual amount of gas being accessed due to uncertainty regarding the precise amount of off-gassing while en route and the amount of dissipation of that released gas.

SUMMARY

Disclosed herein is a system for degassing a fluid including a sample probe in operable communication with a pump which is in operable communication with a gas trap wherein one or more nozzles are located to accelerate and expel the fluid into the gas trap thereby liberating dissolved gases in the fluid.

A method for degassing a fluid is also disclosed. The method includes directing a pressurized fluid toward one or more nozzles accelerating and expelling fluid through the nozzles.

BRIEF DESCRIPTION OF THE DRAWINGS

Referring now to the drawings wherein like elements are numbered alike in the several Figures:

FIG. 1 is a view of gas trap system disclosed herein;

FIG. 2 is a perspective view of a sample probe;

DETAILED DESCRIPTION

Figure 3:
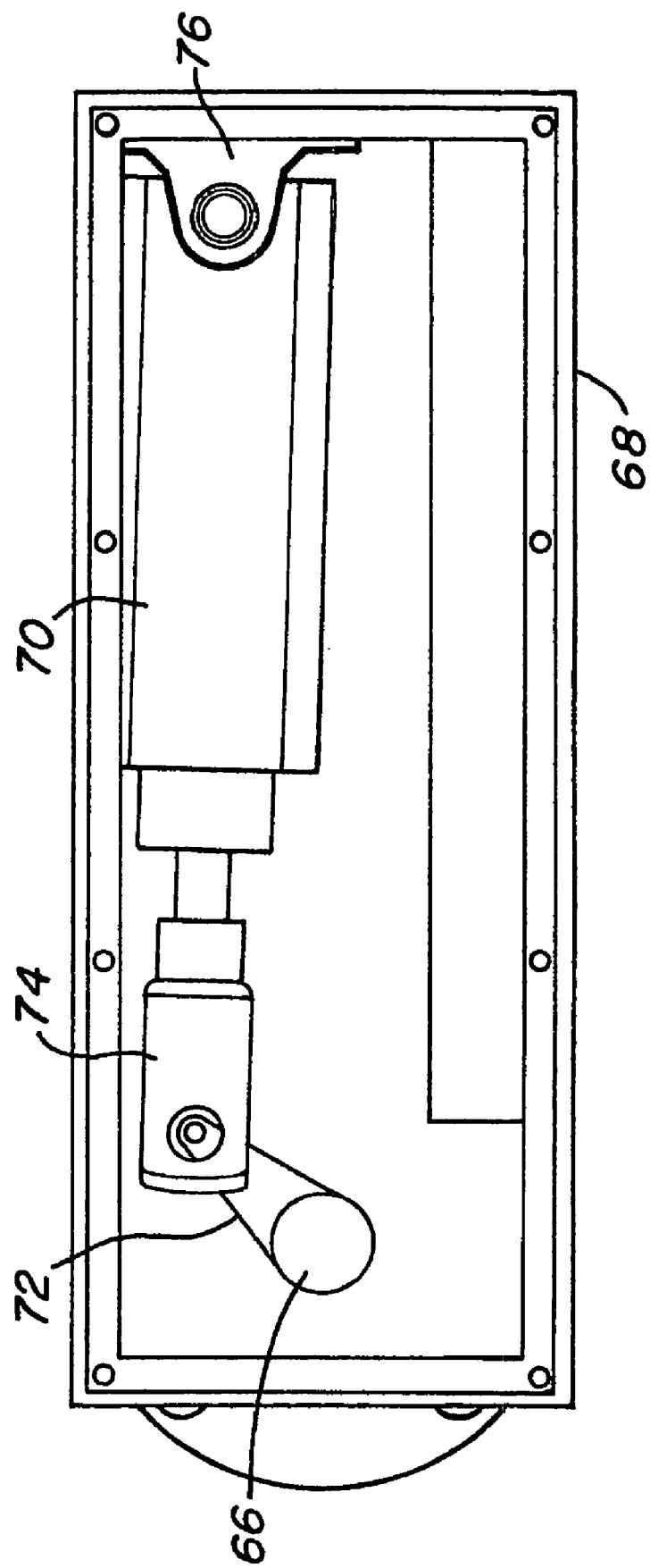
FIG. 3 is a schematic top plan view of the sample probe of FIGS. 1 and 2.
Figure 4:
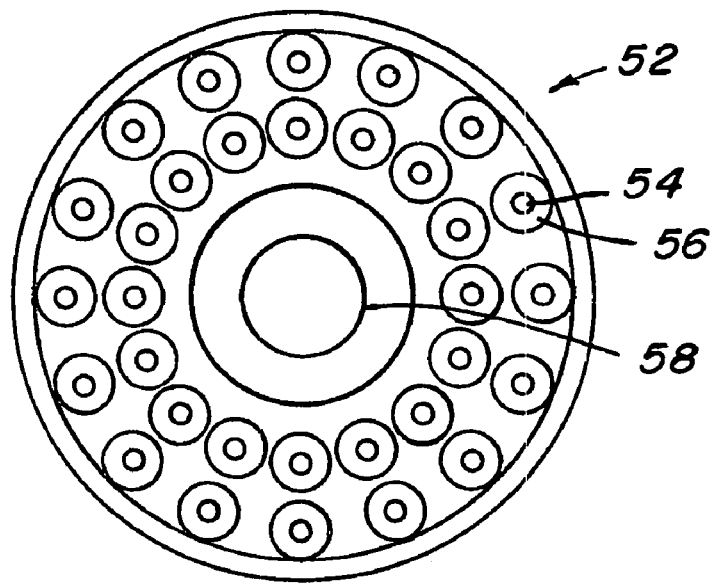
FIG. 4 is a bottom plan view of a strainer of the sample probe.
Figure 5:
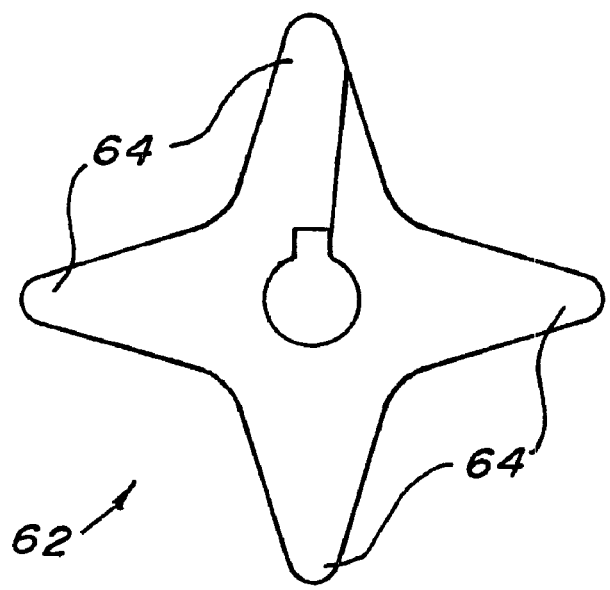
FIG. 5 is a bottom plan view of the blade of the sample probe.
Figure 6:
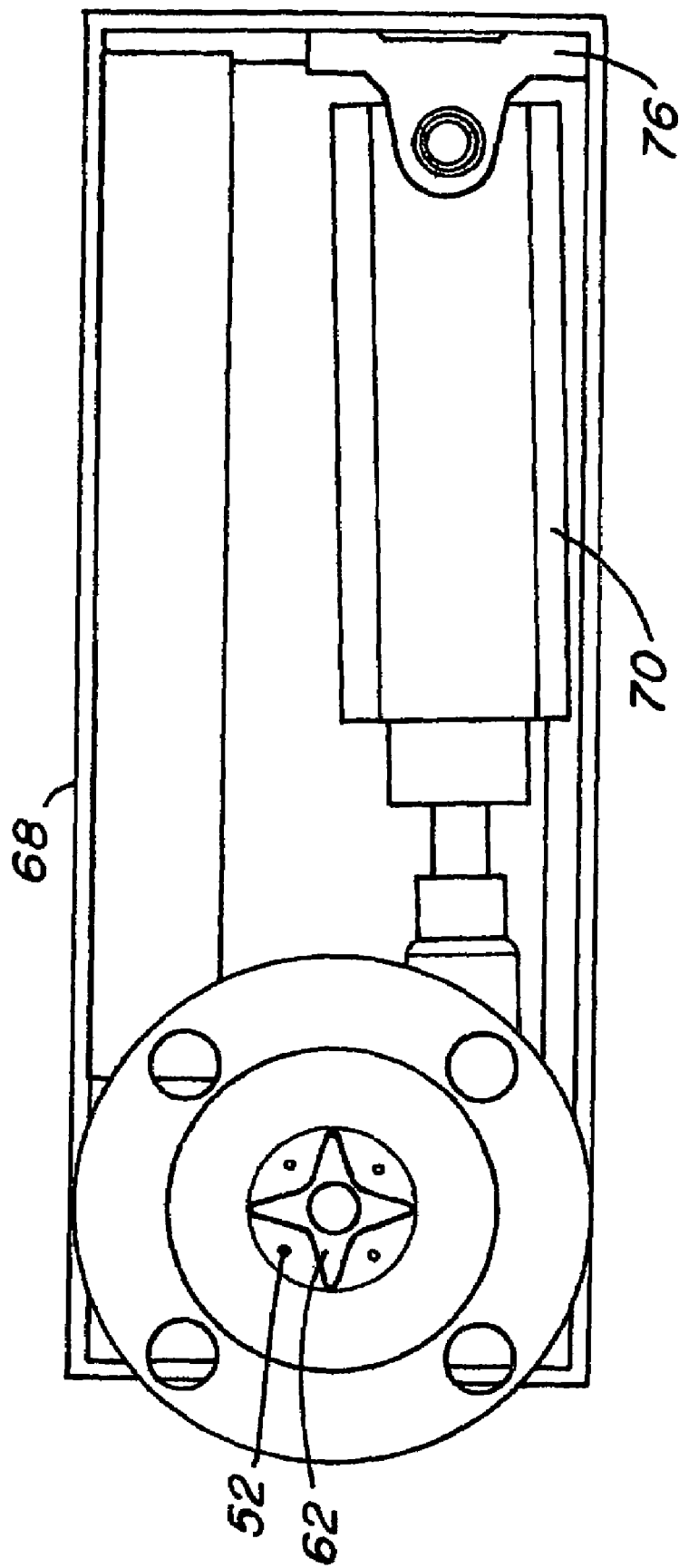
FIG. 6 is a schematic bottom plan view of the sample probe.

Referring to FIG. 1 an embodiment of a gas trap system in accordance with this disclosure is illustrated. For clarity, each of the major operational elements of the device are introduced first with discussion of the specifics of each element following.

System 10 comprises a sample probe 50 in operational communication with a pump 100. The pump 100 provides a motive force for a fluid such as drilling mud to be extracted by the sample probe 50 and to, under pressure, deliver the fluid to a gas trap 150 wherein the pressurized fluid is expelled through at least one nozzle (discussed below) to cause degassing of the fluid. The gas is then caused to enter a measuring apparatus 200. The degassed fluid is returned to a fluid holding tank or a flow of the fluid. The measuring apparatus 200 may be integral with the gas trap 150 or may be a remote unit connected to the gas trip via appropriate conduit. The system is small in size and lends itself to installation wherever desired. Often the most desirable flow is nearest the original exit of mud from the wellbore. The system described herein can be installed right at the wellhead.

Addressing the elements of the system individually, reference is made to FIGS. 1-6 wherein several views related to the sample probe 50 are provided. Many of the components of this element are numbered in each of the views. Review of all of the views together may assist in developing an understanding of the element.

Sample probe 50 has a fluid pick-up function. Since the fluid that is picked up is in this embodiment (e.g. drilling mud returning from a downhole environment where formation materials are being comminuted to create a borehole) the mud is commonly a carrier for particulate matter that is not desired to be introduced to the gas trap system 10. For this reason probe 50 includes a strainer 52. The strainer 52 (FIG. 4), in one embodiment, is a plate having a plurality of through holes 54 and which holes may be angularly counter sunk 56. Strainer 52 also includes a through bore 58 for a shaft. In one embodiment, the collective surface area occupied by holes 54 is 50 square millimeters. It will be appreciated that the primary purpose of the strainer 52 is to prevent ingress of particles to sample probe 50, and therefore the rest of the system. The particular configuration and makeup of the strainer 52 could be altered without difficulty. Strainer 52 is connected to tube 60 through which fluid is taken up.

In order to keep strainer 52 clear of debris that might otherwise inhibit desired fluid flow therethrough, blade 62 (FIG. 5) is in operable communication with the sample probe 50. In the illustrated embodiment, blade 62 has four lobes 64. Fewer or more lobes could be substituted although it will be understood that more lobes may have an adverse effect on total available fluid passage area depending upon both number and width of individual lobes. This may or may not be a problem depending on design parameters of the system and flow rate desired. Blade 62 is configured to be driven by a shaft 66 in any of a number of known ways, such as by a pneumatic drive, electric motor, hydraulic motor, internal combustion motor, etc.

Shaft 66 extends to body 68 of sample probe 50. Within body 68 is a drive 70 configured to move blade 62 to clean strainer 52 of debris. Drive 70 in one embodiment is a pneumatic drive and is run by a compressed air source such as rig air. Referring to FIG. 3, an upper end of shaft 66 is visible connected to arm 72. Arm 72 is pivotally connected to drive rod 74, which rod may be a piston rod. Rod 74 is driven by drive 70, which in one embodiment comprises a pneumatic cylinder. In the illustrated embodiment, drive 70 is pivotally mounted to body 68 via pivot mount 76. In one embodiment hereof, drive 70 is configured to cause rotation of blade 62 through 90 degrees of motion or less if blade 62 encounters resistance. In the event resistance is encountered, blade 62 is caused by drive 70 to reverse direction. An alarm at a control location is also contemplated in the event of a direction reversal. The alarm may be visual or audible or both as desired and appropriate.

Referring back to FIG. 1, tube 60 further includes a fluid output connection 78 which may be any suitable connection to a conveying conduit such as hose 80 to pump 100.

Pump 100 may be of any type capable of moving mud into probe 50 through the pump and into gas trap 150 in a pressurized condition. In one embodiment hereof a peristaltic pump, commercially available from many locations, is employed due to its simplicity, reliability, low cost, and ease of operation and maintenance. The pump 100 comprises an inlet 102 and outlet 104. Driving fluid through both inlet and outlet is a pair of rollers 106 on a centrally located and rotationally driven roller arm 108. The rollers 106, as illustrated in FIG. 1, compress hose 110 as they roll thereover. The compressed hose effectively seals the same and the rolling motion urges material therein in the direction in which the roller 106 is traveling. Fluid exiting pump 100 through outlet 104 is conveyed to a gas trap 150 through suitable means such as a conduit 112. The discharge rate of the pump 100 is not critical to operation but it is desirable for that rate to remain constant.

Still referring to FIG. 1, one embodiment of a routing of conduit 112 to gas trap 150 is illustrated. In this embodiment, conduit 112 is split at a junction 114 into conduits 116 and 118, which connect to a gas trap housing 152 at nozzles 154 and 156, respectively. The nozzles are configured to accelerate fluid passing therethrough and are directed generally toward each other to cause pressurized fluid exiting from nozzles 154 and 156 to collide within housing 152 thereby liberating dissolved gas there. Nozzles of 4.8 mm are employed in one embodiment. In one embodiment, nozzles 154 and 156 point directly at one another for a "head-on" impact of the pressurized fluid. The fluid could, of course, intersect at an angle. In other embodiments of gas trap 150 a single nozzle may be employed with pressurized fluid impacting an opposing wall of housing 152 or a structure (or target) within housing 152. In such case only one of conduits 116 and 118 and one of nozzles 154 and 156 would be needed.

Figure 7:
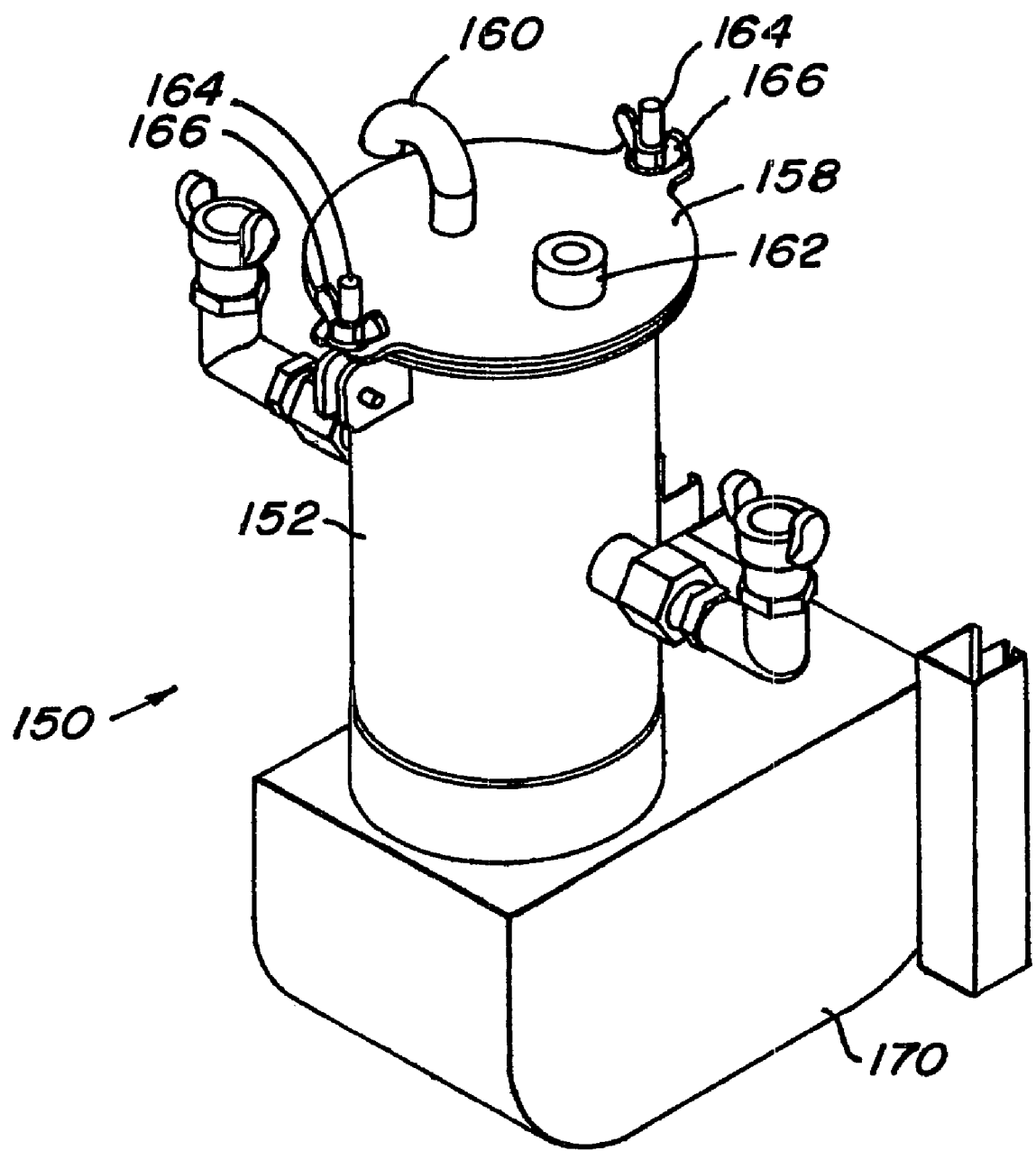
FIG. 7 is a perspective schematic view of the gas trap of the FIG. 1 system.

The gas trap 150 referring to FIGS. 1 and 7, further comprises a cover 158 with a fluid inlet 160 and a fluid outlet 162 and a securement arrangement illustrated as a t-bolt 164 and wing nut 166. Securement may of course be effected by other equivalent means. In this embodiment, inlet 160 allows atmospheric fluid to flow into housing 152 to mix with evolved gases prior to that mixture being drawn off through outlet 162 to gas measuring device 200.

Further illustrated, in FIGS. 1 and 7, is an auxiliary level tank 170. An exit from the tank will return mud to the flow. Alternatively, the tank 170 can be omitted, with the gas trap directly connected to a flow for redeposit of the degassed mud. It will be appreciated from FIG. 1 that the mud fluid level in tank 170 is maintained above the bottom edge 172 of housing 152 to avoid the unintentional addition of excess gas from other sources to the housing 152 interior. The tank 170 in this embodiment includes a spillway 174 leading back to a mud circulation system. It will be appreciated that the spillway is located above the lower edge 172 of housing 152 to help ensure that the mud level does not fall below lower edge 172 of housing 152.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A gas trap system comprising:
a sample probe having a strainer and a blade configured to displace debris from the strainer in use the blade being driven in 90 degree increments;
a pump in operable communication with the sample probe;
a gas trap in operable communication with the pump; and
one or more nozzles configured to admit and accelerate fluid, the one or more nozzles being positioned between the pump and the gas trap.

2. A gas trap as claimed in claim 1 wherein said one or more nozzles is two nozzles each of which directs a pressurized volume of fluid in intersecting paths.

3. A gas trap as claimed in claim 2 wherein said volumes of fluid are directed at one another.

4. A gas trap as claimed in claim 1 wherein the 90 degree increments are reversed in direction at each occurrence.

5. A gas trap as claimed in claim 1 wherein said blade is driven by a pneumatic drive.

6. A gas trap as claimed in claim 1 wherein the pump is a peristaltic pump.

7. A gas trap as claimed in claim 1 wherein the gas trap includes a level tank to maintain degassed fluid level above a bottom edge of the gas trap.

8. A gas trap as claimed in claim 1 wherein the pump is configured to maintain a constant discharge rate.

9. A method for degassing a fluid comprising:
drawing fluid from a fluid source through a strainer;
operating a blade proximate the strainer in 90 degree oscillatory movements to clean the strainer;
pressurizing the fluid;
directing the pressurized fluid to one or more nozzles configured to accelerate fluid moving therethrough; and
expelling said fluid from the one or more nozzles within a gas trap to degas the fluid.

10. A method for degassing a fluid as claimed in claim 9 wherein the method further includes collecting the gas, mixing the gas with another fluid, and measuring a quantity thereof.

11. A method for degassing a fluid as claimed in claim 9 wherein the expelling is at a structure within the gas trap.

12. A method for degassing a fluid as claimed in claim 9 wherein the expelling is at another expelled fluid volume from a second nozzle.

13. A method for degassing a fluid as claimed in claim 9 wherein the expelling is from two nozzles directed such that expelled volumes therefrom intersect.

14. A method for degassing a fluid as claimed in claim 13 where the nozzles are directed at each other.

15. A method for degassing a fluid as claimed in claim 9 wherein the drawing and pressurizing occur in a single pump.

16. A method for degassing a fluid as claimed in claim 9 wherein the method further includes controlling the oscillatory movements such that the blade automatically reverses direction when encountering resistance.

17. A method for degassing a fluid as claimed in claim 9 wherein said operating is by pneumatically driving the blade.

18. A gas trap system comprising:
a sample probe having a strainer and a blade configured to displace debris from the strainer in use and the blade is driven by a device configured to auto reverse upon blade contact with debris causing a load on the blade;
a pump in operable communication with the sample probe;
a gas trap in operable communication with the pump; and
one or more nozzles configured to admit and accelerate fluid, the one or more nozzles being positioned between the pump and the gas trap.

* * * * *